United States Patent
Stunkel et al.

(10) Patent No.: US 6,743,759 B2
(45) Date of Patent: Jun. 1, 2004

(54) ANTIOXIDANT, ANTIWEAR/EXTREME PRESSURE ADDITIVE COMPOSITIONS AND LUBRICATING COMPOSITIONS CONTAINING THE SAME

(75) Inventors: Brian W. Stunkel, Stamford, CT (US); Thomas J. Karol, Holualoa-Kona, HI (US); Steven G. Donnelly, New Fairfield, CT (US)

(73) Assignee: R.T. Vanderbilt Company, Inc., Norwalk, CT (US)

(*) Notice: Subject to any disclaimer, the term of this patent is extended or adjusted under 35 U.S.C. 154(b) by 0 days.

(21) Appl. No.: 10/299,303

(22) Filed: Nov. 19, 2002

(65) Prior Publication Data

US 2003/0134753 A1 Jul. 17, 2003

Related U.S. Application Data

(60) Provisional application No. 60/331,691, filed on Nov. 19, 2001.

(51) Int. Cl.$^7$ .............. C10M 133/44; C10M 135/18
(52) U.S. Cl. ................ 508/281; 508/192; 508/444
(58) Field of Search ............................. 508/281, 444

(56) References Cited

U.S. PATENT DOCUMENTS

| 4,648,985 A | 3/1987 | Thorsell | 508/364 |
| 4,880,551 A | 11/1989 | Doe | 252/47.5 |
| 5,308,521 A | 5/1994 | Pavilon | 508/192 |
| 5,885,942 A | 3/1999 | Zhang et al. | 508/184 |
| 6,083,889 A | 7/2000 | Angelo | 508/281 |
| 6,184,262 B1 | 2/2001 | Suhoza et al. | 521/90 |

*Primary Examiner*—Ellen M McAvoy
(74) *Attorney, Agent, or Firm*—Norris McLaughlin & Marcus

(57) ABSTRACT

This invention relates to improved antioxidant antiwear/extreme pressure compositions consisting of (a) methylenebis(di-n-butyldithiocarbamate) and (b) a diphenylamine derivative of tolutriazole or benzotriazole wherein the (a):(b) mass precent ratio ranges from above about 4:1 to about 50:1 and lubricating compositions containing same.

16 Claims, 1 Drawing Sheet

ANTIOXIDANT, ANTIWEAR/EXTREME PRESSURE ADDITIVE COMPOSITIONS AND LUBRICATING COMPOSITIONS CONTAINING THE SAME

This application claims benefit of provisional application 60/331,691 filed Nov. 19, 2001.

FIELD OF THE INVENTION

This application relates to improved antioxidant, antiwear/extreme pressure additive compositions and lubricating compositions containing the same.

BACKGROUND OF THE INVENTION

In U.S. Pat. No. 4,880,551, there are provided synergistic antioxidant compositions containing (a) 1-[di(4-octylphenyl)aminomethyl]tolutriazole and (b) an antioxidant selected from the group consisting of methylenebis(di-n-butyldithiocarbamate), 2,6-di-t-butyl-4-sec-butylphenol, 2,6-di-t-butyl-4-methylphenol and butylated phenol mixture and wherein the ratio of the tolutriazole compound to the antioxidant ranges from about 1:4 to about 4:1.

Surprisingly, it has been discovered that methylenebis(di-n-butyldithiocarbamate) when used in conjunction with a diphenylamine derivative of tolutriazole or benzotriazole (henceforth "benzotriazole derivative") at a ratio of above about 4:1 to about 50:1, show similar synergistic effect with respect to antioxidant activity as the antioxidant compositions disclosed in U.S. Pat. No. 4,880,551 with ratios of 1:4 to 4:1 but with improved antiwear/extreme pressure (EP) performance in lubricants.

SUMMARY OF THE INVENTION

A first embodiment of the invention is an antioxidant composition with improved antiwear/extreme pressure performance which comprises: (a) methylenebis(di-n-butyldithiocarbamate) and (b) a diphenylamine derivative of tolutriazole or benzotriazole wherein the (a):(b) mass precent ratio ranges from above about 4:1 to about 50:1.

A second embodiment of the invention is an antioxidant composition with improved antiwear/extreme pressure performance containing methylenebis(di-n-butyldithiocarbamate) and a diphenylamine derivative of tolutriazole or benzotriazole at a ratio of about 5:1 to about 40:1.

A third embodiment of the invention is an antioxidant composition with improved antiwear/extreme pressure performance containing methylenebis(di-n-butyldithiocarbamate) and a diphenylamine derivative of tolutriazole or benzotriazole at a ratio of about 11.3:1 to about 38:1.

Another embodiment of the invention relates lubricating compositions having improved antioxidant, antiwear and extreme pressure properties which comprise a major portion of an oil of lubrication viscosity and oxidation inhibiting amount of the antioxidant composition of the invention.

Additionally it has been found that additional tolutriazole and benzotriazole derivatives are effective.

DETAILED DESCRIPTION OF THE INVENTION

Figure 1:
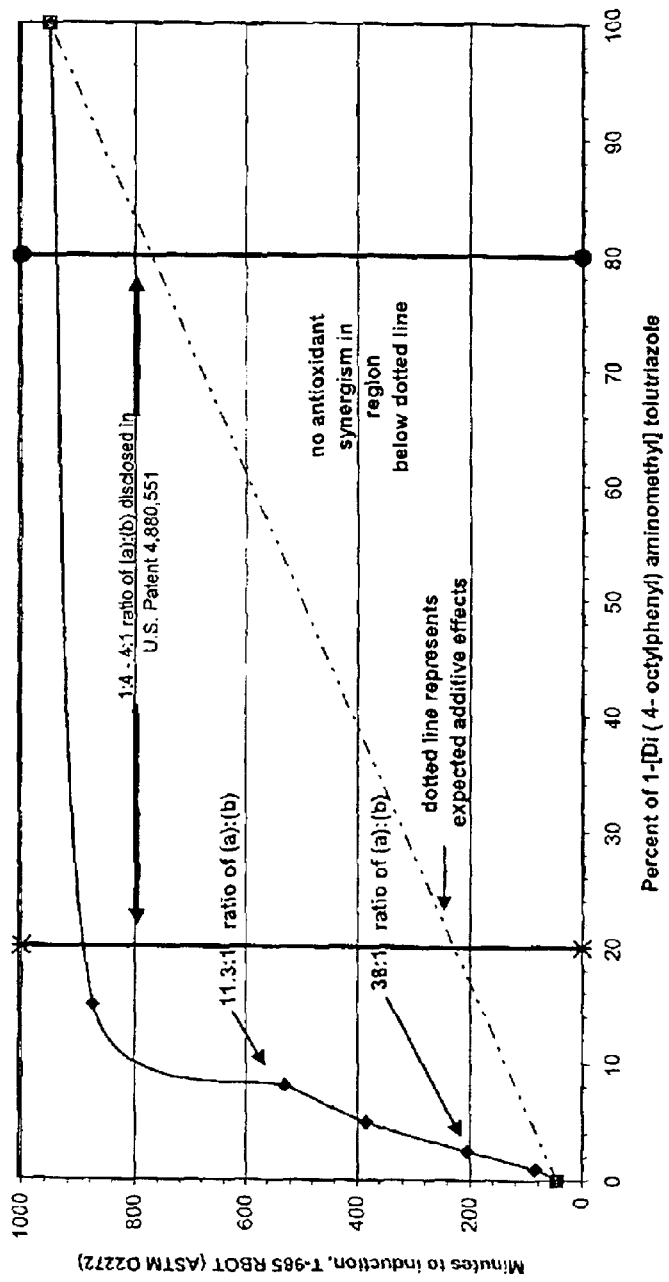
FIG. 1 depicts the number of minutes to induction (based on T-985 RBOT (ASTM D2272) test) for various ratios of (a):(b) where (a) is methylenebis-(dibutyldithiocarbamate) and (b) 1-[di-(4-octylphenyl)aminomethyl]tolutriazole

The 1-[alkyl diphenyl)aminomethyl]tolutriazole or benzotriazole compounds are prepared in a known manner from tolutriazole or benzotriazole (or mixtures thereof), formaldehyde and alkylated diphenylamine by means of the Mannich reaction. These variations are described in U.S. Pat. No. 6,184,262, which is hereby incorporated by reference. The benzotriazole derivatives of formula I

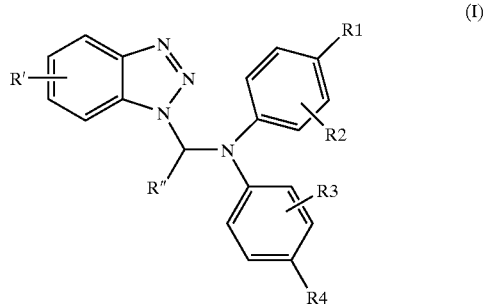

wherein R' and R" are independently selected from hydrogen or lower alkyl, R1–R4 are independently selected from alkyl having up to 11 carbon atoms or phenylalkyl, or mixtures thereof. Tolutriazole designates benzotriazole compound which is methylated in the benzene ring in the 4-position and/or 5-position. Therefore, the derivative is designated "benzotriazole derivative"

One such benzotriazole derivative is commercially available under the trade name VANLUBE® 887 or VANLUBE® 887E, manufactured by the R.T. VANDERBILT company.

The antioxidant is a known material and is commercially available under the trade names: VANLUBE® 7723, methylenebis(di-n-butyldithiocarbamate), distributed by R.T. Vanderbilt Company, Inc. Small amounts of the benzotriazole derivative produces synergistic antioxidant effect when combined with methylenebis(di-n-butyldithiocarbamate) in certain ratios as was shown in U.S. Pat. No. 4,880,551. Surprisingly, it has been discovered that improved antiwear and extreme pressure properties can be added to the compositions with no appreciable loss of antioxidant effect by producing compositions with a ratio of above about 4:1 to 50:1 (by weight) of methylenebis(di-n-butyldithiocarbamate): benzotriazole derivative.

The improved antioxidant antiwear compositions of the invention may be incorporated in the lubricating compositions by known methods in an amount effective to produce the desired oxidation inhibiting characteristics. In one embodiment of the invention, the amount may range from about 0.01 to 5.0 percent by weight based on the total weight of the lubricating composition. In another embodiment of the invention, the amount range is about 0.1 to 3.0 percent of the additive based on the total weight of the lubricating composition. The compositions impart metal deactivating as well as oxidation inhibiting properties to natural and synthetic lubricants formulated as oils or greases.

The base oils employed as lubricant vehicles are typical oils used in automotive and industrial applications such as, among others, turbine oils, hydraulic oils, gear oils, crankcase oils and diesel oils. Natural base oils include mineral oils, petroleum oils, and vegetable oils. The base oil may also be selected from oils derived from petroleum hydrocarbon and synthetic sources. The hydrocarbon base oil may be selected from naphthenic, aromatic, and paraffinic mineral oils. The synthetic oils may be selected from, among others, ester-type oils (such as silicate esters, pentaerythritol esters and carboxylic acid esters), hydrogenated mineral oils, silicones, silanes, polysiloxanes, alkylene polymers, and polyglycol ethers.

The lubricating compositions optionally contain the necessary ingredients to prepare the composition, as for example dispersing agents, emulsifiers, and viscosity improvers. Greases may be prepared by adding thickeners, as for example salts and complexes of fatty acids, polyurea compounds, clays and quarternary ammonium bentonite. Depending on the intended use of the lubricant, other functional additives may be added to enhance a particular property of the lubricant.

The lubricating compositions may also contain one or more of the following additives:

1. Borated and/or non-borated dispersants
2. Additional antioxidant compounds
3. Seal swell compositions
4. Friction modifiers
5. Extreme pressure/antiwear agents
6. Viscosity modifiers
7. Pour point depressants
8. Detergents
9. Phosphates
10. Antifoamants
11. Rust inhibitors
12. Copper corrosion inhibitors 1. Borated and/or Non-Borated Dispersants Non-borated ashless dispersants may be incorporated within the final fluid composition in an amount comprising up to 10 weight percent on an oil-free basis. Many types of ashless dispersants listed below are known in the art. Borated ashless dispersants may also be included.

(A) "Carboxylic dispersants" are reaction products of carboxylic acylating agents (acids, anhydrides, esters, etc.) containing at least about 34 and preferably at least about 54 carbon atoms reacted with nitrogen-containing compounds (such as amines), organic hydroxy compounds (such aliphatic compounds including monohydric and polyhydric alcohols, or aromatic compounds including phenols and naphthols), and/or basic inorganic materials. These reaction products include imide, amide, and ester reaction products of carboxylic acylating agents. Examples of these materials include succinimide dispersants and carboxylic ester dispersants. The carboxylic acylating agents include alkyl succinic acids and anhydrides wherein the alkyl group is a polybutyl moiety, fatty acids, isoaliphatic acids (e.g., 8-methyloctadecanoic acid), dimer acids, addition dicarboxylic acids, addition (4+2 and 2+2) products of an unsaturated fatty acid with an unsaturated carboxylic reagent), trimer acids, addition tricarboxylic acids (e.g., Empol® 1040, Hystrene® 5460 and Unidyme® 60), and hydrocarbyl substituted carboxylic acylating agents (from olefins and/or polyalkenes). In one preferred embodiment, the carboxylic acylating agent is a fatty acid. Fatty acids generally contain from about 8 up to about 30, or from about 12 up to about 24 carbon atoms. Carboxylic acylating agents are taught in U.S. Pat. Nos. 2,444,328, 3,219,666 and 4,234,435, which are incorporated herein by reference. The amine may be a mono- or polyamine. The monoamines generally have at least one hydrocarbyl group containing 1 to about 24 carbon atoms, with from 1 to about 12 carbon atoms. Examples of monoamines include fatty ($C_8$–$C_{30}$) amines, primary ether amines (SURFAM® amines), tertiary-aliphatic primary amines ("Primene"), hydroxyamines (primary, secondary or tertiary alkanol amines), ether N-(hydroxyhydrocarbyl) amines, and hydroxyhydrocarbyl amines ("Ethomeens" and "Propomeens"). The polyamines include alkoxylated diamines ("Ethoduomeens"), fatty diamines ("Duomeens"), alkylenepolyamines (ethylenepolyamines), hydroxy-containing polyamines, polyoxyalkylene polyamines (such as JEFFAMINES), condensed polyamines (a condensation reaction between at least one hydroxy compound with at least one polyamine reactant containing at least one primary or secondary amino group), and heterocyclic polyamines. Useful amines include those disclosed in U.S. Pat. No. 4,234,435 and U.S. Pat. No. 5,230,714, which are incorporated herein by reference. Examples of these "carboxylic dispersants" are described in British Patent 1,306,529 and in U.S. Pat. Nos. 3,219,666, 3,316,177, 3,340,281, 3,351,552, 3,381,022, 3,433,744, 3,444,170, 3,467,668, 3,501,405, 3,542,680, 3,576,743, 3,632,511, 4,234,435, and Re 26,433, which are incorporated herein by reference for disclosure of dispersants.

(B) "Amine dispersants" are reaction products of relatively high molecular weight aliphatic or alicyclic halides and amines, preferably polyalkylene polyamines. Examples thereof are described, for example, in U.S. Pat. Nos. 3,275,554, 3,438,757, 3,454,555, and 3,565,804 which are incorporated herein by reference for disclosure of dispersants.

(C) "Mannich dispersants" are the reaction products of alkyl phenols in which the alkyl group contains at least about 30 carbon atoms with aldehydes (especially formaldehyde) and amines (especially polyalkylene polyamines). The materials described in U.S. Pat. Nos. 3,036,003, 3,236,770, 3,414,347, 3,448,047, 346,172, 3,539,633, 3,586,629, 3,591, 598, 3,634,515, 3,725,480, and 3,726,882 are incorporated herein by reference for disclosure of dispersants.

(D) Post-treated dispersants are obtained by reacting carboxylic, amine or Mannich dispersants with reagents such as urea, thiourea, carbon disulfide, aldehydes, ketones, carboxylic acids, hydrocarbon-substituted succinic anhydrides, nitriles, epoxides, boron compounds, phosphorus compounds or the like. U.S. Pat. Nos. 3,200,107, 3,282, 955, 3,367,943, 3,513,093, 3,639,242, 3,649,659, 3,442,808, 3,455,832, 3,579,450, 3,600,372, 3,702,757, and 3,708,422 are incorporated herein by reference for disclosure of dispersants.

(E) Polymeric dispersants are interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)-substituted acrylates. Polymer dispersants are disclosed in U.S. Pat. Nos. 3,329,658, 3,449,250, 3,519,656, 3,666,730, 3,687, 849, and 3,702,300 which are incorporated herein by reference for disclosure of dispersants and ashless dispersants.

Borated dispersants are described in U.S. Pat. Nos. 3,087, 936 and 3,254,025 which are incorporated herein by reference for disclosure of borated dispersants.

Also included as possible dispersant additives are those disclosed in U.S. Pat. Nos. 5,198,133 and 4,857,214 which are incorporated herein by reference. The dispersants of these patents compare the reaction products of an alkenyl succinimide or succinimide ashless dispersant with a phosphorus ester or with an inorganic phosphorus-containing acid or anhydride and a boron compound.

2. Additional Antioxidant Compounds

Other antioxidant may be used in the compositions of the present invention, if desired. Typical antioxidants include hindered phenolic antioxidants, secondary aromatic amine antioxidants, sulfurized phenolic antioxidants, oil-soluble copper compounds, phosphorus-containing antioxidants, organic sulfides, disulfides and polysulfides and the like.

Illustrative sterically hindered phenolic antioxidants include orthoalkylated phenolic compounds such as 2,6-di-tertbutylphenol, 4-methyl-2,6-di-tertbutylphenol, 2,4,6-tri-tertbutylphenol, 2-tert-butylphenol, 2,6-disopropylphenol, 2-methyl-6-tertbutylphenol, 2,4-dimethyl-6-tertbutylphenol, 4-(N,N-dimethylaminomethyl)-2,8-di-tertbutylphenol, 4-ethyl-2,6-di-tertbutylphenol, 2-methyl-6-styrylphenol, 2,6-distyryl-4-nonytphenol, and their analogs and homologs. Mixtures of two or more such mononuclear phenolic compounds are also suitable.

Other preferred phenol antioxidants for use in the compositions of this invention are methylene-bridged alkylphenols, and these can be used singly or in combinations with each other, or in combinations with sterically-hindered unbridged phenolic compounds. Illustrative methylene-bridged compounds include 4,4'-methylenebis(6-tert-butyl o-cresol), 4,4'-methylenebis(2-tert-amyl-o-cresol), 2,2'-methytenebis(4-methyl-6-tert-butylphenol), 4,4'-methylenehis(2,6-di-tertbutylphenol), and similar compounds. Particularly preferred are mixtures of methylene-bridged alkylphenols such as are described in U.S. Pat. No. 3,211,652, which is incorporated herein by reference.

Amine antioxidants, especially oil-soluble aromatic secondary amines may also be used in the compositions of this invention. Although aromatic secondary monoamines are preferred, aromatic secondary polyamines are also suitable. Illustrative aromatic secondary monoamines include diphenylamine, alkyl diphenylamines containing 1 or 2 alkyl substituents each having up to about 16 carbon atoms, phenyl-.beta.-naphthylamine, phenyl-P-napthylamine, alkyl- or aralkylsubstituted phenyl-.beta.-naphthylamine containing one or two alkyl or aralkyl groups each having up to about 16 carbon atoms, alkyl- or aralkylsubstituted phenyl-p-naphthylamine containing one or two alkyl or aralkyl groups each having up to about 16 carbon atoms, and similar compounds.

A preferred type of aromatic amine antioxidant is an alkylated diphenylamine of the general formula:

where $R_1$ is an alkyl group (preferably a branched alkyl group) having 8 to 12 carbon atoms, (more preferably 8 or 9 carbon atoms) and $R_2$ is a hydrogen atom or an alkyl group (preferably a branched alkyl group) having 8 to 12 carbon atoms, (more preferably 8 or 9 carbon atoms). Most preferably, $R_1$ and $R_2$ are the same. One such preferred compound is available commercially as Naugalube® 438L, a material which is understood to be predominately a 4,4'-dinonytdiphenylamine (i.e., bis(4-nonyiphenyl) (amine)) in which the nonyl groups are branched.

Another useful type of antioxidant for preferred inclusion in the compositions of the invention are one or more liquid, partially sulfurized phenolic compounds such as are prepared by reacting sulfur monochloride with a liquid mixture of phenols—at least about 50 weight percent of which mixture of phenols is composed of one or more reactive, hindered phenols—in proportions to provide from about 0.3 to about 0.7 gram atoms of sulfur monochloride per mole of reactive, hindered phenol so as to produce a liquid product. Typical phenol mixtures useful in making such liquid product compositions include a mixture containing by weight about 75% of 2,6-di-tert-butylphenol, about 10% of 2-tert-butylphenol, about 13% of 2,4.6-tri-tertbutylphenol, and about 2% of 2,4-di-tertbutylphenol. The reaction is exothermic and thus is preferably kept within the range of about 15.degree. C. to about 70.degree. C., most preferably between about 40.degree. C. to about 60.degree. C.

Another useful type of antioxidant are 2,2,4-trimethyl-1, 2-dihydroquinoline (TMDQ) polymers and homologs containing aromatized terminal units such as those described in U.S. Pat. No. 6,235,686, which is hereby incorporated by reference.

Mixtures of different antioxidants may also be used. One suitable mixture is comprised of a combination of: (i) an oil-soluble mixture of at least three different sterically-hindered tertiary butylated monohydric phenols which is in the liquid state at 25.degree. C.; (ii) an oil-soluble mixture of at least three different sterically-hindered tertiary butylated methylene-bridged polyphenols; and (iii) at least one bis(4-alkylphenyl) amine wherein the alkyl group is a branched alkyl group having 8 to 12 carbon atoms, the proportions of (i), (ii) and (iii) on a weight basis failing in the range of 3.5 to 5.0 parts of component (i) and 0.9 to 1.2 parts of component (ii) per part by weight of component (iii), as disclosed in U.S. Pat. No. 5,328,619, which is incorporated herein by reference.

Other useful preferred antioxidants are those included in the disclosure of U.S. Pat. No. 4,031,023, which is herein incorporated by reference.

3. Seal Swell Compositions

Compositions which are designed to keep seals pliable are also well known in the art. A preferred seal swell composition is isodecyl sulfolane. The seal swell agent is preferably incorporated into the composition at about 0.1–3 weight percent. Substituted 3-alkoxysulfolanes are disclosed in U.S. Pat. No. 4,029,587 which is incorporated herein by reference.

4. Friction Modifiers

Friction modifiers are also well known to those skilled in the art. A useful list of friction modifiers are included in U.S. Pat. No. 4,792,410, which is incorporated herein by reference. U.S. Pat. No. 5,110,488 discloses metal salts of fatty acids and especially zinc salts and is incorporated herein by reference. Useful friction modifiers include fatty phosphites, fatty acid amides, fatty epoxides, borated fatty epoxides, fatty amines, glycerol esters, borated glycerol esters alkoxylated fatty amines, borated alkoxylated fatty amines, metal salts of fatty acids, sulfurized olefins, fatty imidazolines, molybdenum dithiocarbamates (e.g., U.S. Pat. No. 4,259, 254, incorporated herein by reference), molybdate esters (e.g., U.S. Pat. No. 5,137,647 and U.S. Pat. No. 4,889,647, both incorporated herein by reference), molybdate amine with sulfur donors (e.g., U.S. Pat. No. 4,164,473 incorporated herein by reference), and mixtures thereof.

The preferred friction modifier is a borated fatty epoxide as previously mentioned as being included for its boron content. Friction modifiers are preferably included in the compositions in the amounts of 0.1–10 weight percent and may be a single friction modifier or mixtures of two or more.

Friction modifiers also include metal salts of fatty acids. Preferred cations are zinc, magnesium, calcium, and sodium and any other alkali, or alkaline earth metals may be used. The salts may be overbased by including an excess of cations per equivalent of amine. The excess cations are then treated with carbon dioxide to form the carbonate. The metal salts are prepared by reacting a suitable salt with the acid to form the salt, and where appropriate adding carbon dioxide to the reaction mixture to form the carbonate of any cation beyond that needed to form the salt. A preferred friction modifier is zinc oleate.

5. Extreme Pressure/Antiwear Agents

Dialkyl dithiophosphate succinates may be added to provide antiwear protection. Zinc salts are preferably added as zinc salts of phosphorodithioic acids or dithiocarbamic acid. Among the preferred compounds for use are zinc, diisooctyl dithiophosphate and zinc dibenzyl dithiophosphate and amyl dithiocarbamic acid. Also included in lubricating compositions in the same weight percent range as the zinc salts to give antiwear/extreme pressure performance are dibutyl hydrogen phosphite (DBPH) and triphenyl monothiophosphate, and the thiocarbamate ester formed by reacting dibutyl amine-carbon disulfide- and the methyl ester of acrylic acid. The thiocarbamate is described in U.S. Pat. No. 4,758,362 and the phosphorus-containing metal salts are described in U.S. Pat. No. 4,466,894. Both patents are incorporated herein by reference. Antimony or lead salts may also be used for extreme pressure. The preferred salts are of dithiocarbamic acid such as antimony diamyldithiocarbamate.

6. Viscosity Modifiers

Viscosity modifiers (VM) and dispersant viscosity modifiers (DVM) are well known. Examples of VMs and DVMs are polymethacrylates, polyacrylates, polyolefins, styrene-maleic ester copolymers, and similar polymeric substances including homopolymers, copolymers and graft copolymers. Examples of commercially available VMs, DVMs and their chemical types are listed below. The DVMs are designated by a (D) after their number. Representative viscosity modifers that are commercially available are listed below in Table 1.

TABLE 1

| Viscosity Modifier | Tradename | Commercial Source |
|---|---|---|
| 1. Polyisobutylenes | Indopol ® | Amoco |
| | Parapol ® | Exxon (Paramins) |
| | Polybutylene ® | Chevron |
| | Hyvis ® | British Petroleum |
| 2. Olefin copolymers | Lubrizol ® 7060, 7065, 7067 | Lubrizol |
| | Paratone ® 8900, 8940, 8452, 8512 | Exxon |
| | ECA-6911 | Exxon (Paramins) |
| | TLA 347, 555(D), 6723(D) | Texaco |
| | Trilene ® CP-40, CP-60 | Uniroyal |
| 3. Hydrogenated styrenediene copolymers | Shelivis ® 50, 40 | Shell |
| | LZ ® 7341, 7351, 7441 | Lubrizol |
| 4. Styrene, maleate copolymers | LZ ® 3702(D), 3715, 3703(D) | Lubrizol |
| 5. Polymethacrylates (PMA) | Acryloid ® 702, 954(D), 985(D), 1019, 1265(D) | Rohm GmbH |
| | TLA 388, 407, 5010(D), 5012(D) | Texaco |
| | Viscoplex ® 4-950(D), 6-500(D), 1515 | Robin GmbH |
| 6. Olefin-graft PMA polymer | Viscoplex ® 2-500, 2-600 | Robin GmbH |
| 7. Hydrogenated polyisoprene star polymers | Shellvis ® 200, 260 | Shell |

Summaries of viscosity modifiers can be found in U.S. Pat. Nos. 5,157,088, 5,256,752 and 5,395,539, which are incorporated herein by reference. The VMs and/or DVMs preferably are incorporated into the fully-formulated compositions at a level of up to 10% by weight.

7. Pour Point Depressants (PPD)

These components are particularly useful to improve low temperature qualities of a lubricating oil. A preferred pour point depressant is an alkylnaphthalene. Pour point depressants are disclosed in U.S. Pat. Nos. 4,880,553 and 4,753,745, which are incorporated herein by reference. PPDs are commonly applied to lubricating compositions to reduce viscosity measured at low temperatures and low rates of shear. The pour point depressants are preferably used in the range of 0.1–5 weight percent. Examples of tests used to access low temperature low shear-rate rheology of lubricating fluids include ASTM D97 (pour point), ASTM D2983 (Brookfield viscosity), D4684 (Mini-rotary Viscometer) and D5133 (Scanning Brookfield).

Examples of commercially available pour point depressants and their chemical types are listed in Table 2.

TABLE 2

| Pour Point Depressant | Tradename | Source |
|---|---|---|
| Polymethacrylates | Acryloid 154-70, 3003, 3007 | Robin & Haas |
| | LZ ® 7749B, 7742, 7748 | Lubrizol |
| | TC 5301, 10314 | Texaco |
| Vinyl acetate/fumarate or maleate copolymers | ECA 11039, 9153 | Exxon (Paramins) |
| Styrene, maleate copolymers | LZ ® 662 | Lubrizol |

8. Detergents

Lubricating compositions in many cases also preferably include detergents. Detergents as used herein are preferably metal salts of organic acids. The organic acid portion of the detergent is preferably a sulphonate, carboxylate, phenate, or salicylate. The metal portion of the detergent is preferably an alkali or alkaline earth metal. Preferred metals are sodium, calcium, potassium and magnesium. Preferably, the detergents are overbased, meaning that there is a stoichiometric excess of metal over that needed to form the neutral metal salt.

Preferred overbased organic salts are the sulfonate salts having a substantially oleophilic character and which are formed from organic materials. Organic sulfonates are well known materials in the lubricant and detergent arts. The sulfonate compound should preferably contain on average from about 10 to about 40 carbon atoms, more preferably from about 12 to about 36 carbon atoms and most preferably from about 14 to about 32 carton atoms on average. Similarly, the phenates, oxylates and carboxylates preferably have a substantially oleophilic character.

While the present invention allows for the carbon atoms to be either aromatic or in paraffinic configuration, it is highly preferred that alkylated aromatics be employed. While naphthalene based materials may be employed, the aromatic of choice is the benzene moiety.

The one particularly preferred component is thus an overbased monosulfonated alkylated benzene, and is preferably the monoalkylated benzene. Preferably, alkyl benzene fractions are obtained from still bottom sources and are mono- or di-alkylated. It is believed, in the present invention, that the mono-alkylated aromatics are superior to the dialkylated aromatics in overall properties.

It is preferred that a mixture of mono-alkylated aromatics (benzene) be utilized to obtain the mono-alkylated salt (benzene sulfonate) in the present invention. The mixtures wherein a substantial portion of the composition contains polymers of propylene as the source of the alkyl groups assist in the solubility of the salt. The use of monofunctional (e.g., mono-sulfonated) materials avoids crosslinking of the molecules with less precipitation of the salt from the lubricant. It is preferred that the salt be overbased. The excess metal from overbasing has the effect of neutralizing acids which may build up in the lubricant. A second advantage is that the overbased salt increases the dynamic coefficient of friction. Preferably, the excess metal will be present over that which is required to neutralize the acids at about in the ratio of up to about 30:1, preferably 5:1 to 18:1 on an equivalent basis.

The amount of the overbased salt utilized in the composition is preferably from about 0.1 to about 10 weight percents on an oil free basis. The overbased salt is usually made up in about 50% oil with a TBN range of 10–600 on an oil free basis. Borated and non-borated overbased detergents are described in U.S. Pat. Nos. 5,403,501 and 4,792,410 which are herein incorporated by reference for disclosure pertinent hereto.

9. Phosphates

The lubricating compositions can also preferably include at least one phosphorus acid, phosphorus acid salt, phosphorus acid ester or derivative thereof including sulfur-containing analogs preferably in the amount of 0.002–1.0 weight percent. The phosphorus acids, salts, esters or derivatives thereof include compounds selected from phosphorus acid esters or salts thereof, phosphites, phosphorus-containing amides, phosphorus-containing carboxylic acids or esters, phosphorus containing ethers and mixtures thereof In one embodiment, the phosphorus acid, ester or derivative can be a phosphorus acid, phosphorus acid ester, phosphorus acid salt, or derivative thereof. The phosphorus acids include the phosphoric, phosphonic, phosphinic, and thiophosphoric acids including dithiophosphoric acid as well as the monothiophosphoric, thiophosphinic and thiophosphonic acids.

One class of compounds are adducts of O,O-dialkyl-phosphorodithioates and esters of maleic or fumaric acid. The compounds can be prepared by known methods as described in U.S. Pat. No. 3,359,203, as for example O,O-di(2-ethylhexyl) S-(1,2-dicarbobutoxyethyl) phosphorodithioate.

Another class of compounds useful to the invention are dithiophosphoric acid esters of carboxylic acid esters. Preferred are alkyl esters having 2 to 8 carbon atoms, as for example 3-[[bis(1-methylethoxy)phosphinothioyl]thio] propionic acid ethyl ester.

A third class of ashless dithiophosphates for use with the present invention include:

(i) those of the formula

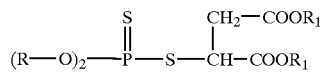

wherein R and $R_1$ are independently selected from, alkyl groups having 3 to 8 carbon atoms (commercially available as VANLUBE 7611M, from R.T. Vanderbilt Co., Inc.);
(ii) dithiophosphoric acid esters of carboxylic acid such as those commercially available as IRGALUBE® 63 from Ciba Geigy Corp.;
(iii) triphenylphosphorothionates such as those commercially available as IRGALUBE® TPPT from Ciba Geigy Corp.; and
(iv) methylene bis(dialkyldithiocarbamates) wherein the alkyl group contains 4 to 8 carbon atoms. For example, methylenebis(dibutyldithiocarbamate) is commercially available as VANLUBE 7723® from R. T. Vanderbilt Co., Inc).

Zinc salts are preferably added to lubricating compositions in amounts of 0.1–5 triphenylphosphorothionates wherein the phenyl group may be substituted by up to two alkyl groups. An example of this group, among others, is triphenyl-phosphorothionate available commercially as IRGALUBE® TPPT (manufactured by Ciba-Geigy Corp.).

A preferred group of phosphorus compounds are dialkyphosphoric acid mono alkyl primary amine salts, such as those described in U.S. Pat. No. 5,354,484 which is herein incorporated by reference. Eighty-five percent phosphoric acid is the preferred compound for addition to the fully formulated ATF package and is preferably included at a level of about 0.01–0.3 weight percent based on the weight of the ATF.

The amine salts of alkyl phosphates are prepared by known methods, e.g., a method disclosed in U.S. Pat. No. 4,130,494, incorporated herein by reference. A suitable mono- or diester of phosphoric acid or their mixtures is neutralized with an amine. When mono-ester is used, two moles of the amine will be required, while the diester will require one mole of the amine. In any case, the amount of amine required can be controlled by monitoring the neutral point of the reaction where the total acid number is essentially equal to the total base number. Alternately, a neutralizing agent such as ammonia or ethylenediamine can be added to the reaction.

The preferred phosphate esters are aliphatic esters, among others, 2-ethylhexyl, n-octyl, and hexyl mono-or diesters. The amines can be selected from primary or secondary amines. Particularly preferred are tert-alkyl amines having 10 to 24 carbon atoms. These amines are commercially available as for example Primene® 81R manufactured by Rohm and Haas Co.

The sulfonic acid salts are well known in the art and are available commercially. Representative of the aromatic sulfonic acids that can be used in preparing the synergists of the invention are alkylated benzenesulfonic acids and alkylated naphthalenesulfonic acids having 1 to 4 alkyl groups of 8 to 20 carbons each. Particularly preferred are naphthalene-sulfonates substituted by alkyl groups having 9 to 18 carbons each, as for example dinonylnaphthalenesulfonate.

10. Antifoamants

Antifoaming agents are well-known in the art as silicone or fluorosilicone compositions. Such antifoam agents are available from Dow Corning Chemical Corporation and Union Carbide Corporation. A preferred fluorosilicone antifoam product is Dow FS-1265. Preferred silicone antifoam products are Dow Corning DC-200 and Union Carbide UC-L45. Other antifoam agents which may be included in the composition either alone or in admixture is a polyacrylate antifoamer available from Monsanto Polymer Products Co. of Nitro, W.Va. known as PC-1244. Also, a siloxane polyether copolymer antifoamer available from OSI Specialties, Inc. of Farmington Hills, Mich. and may also be included. One such material is sold as SILWET-L-7220. The antifoam products are preferably included in the compositions of this invention at a level of 5 to 80 parts per million with the active ingredient being on an oil-free basis.

11. Rust Inhibitors

Embodiments of rust inhibitors include metal salts of alkylnaphthalenesulfonic acids.

12. Copper Corrosion Inhibitors

Embodiments of copper corrosion inhibitors which may optionally be added include include thiazoles, triazoles and thiadiazoles. Example embodiments of such compounds include benzotriazole, tolyltriazole, octyltriazole, decyltriazole, dodecyltriazole, 2-mercapto benzothiazole, 2,5-dimercapto-1,3,4-thiadiazole, 2-mercapto-5-hydrocarbylthio-1,3,4-thiadiazoles, 2-mercapto-5- hydrocarbyldithio-1,3,4-thiadiazoles, 2,5-bis(hydrocarbylthio)-1,3,4-thiadiazoles, and 2,5-bis(hydrocarbyldithio)-1,3,4-thiadiazoles.

The following examples are given for the purpose of illustrating the invention and are not intended to limit the invention. All percentages and parts are based on weight unless otherwise indicated.

EXAMPLES

In FIG. 1, it can be seen that the expected antioxidant effect based on the addition of the DTC falls along the straight dotted line. While the synergistic effect in terms of antioxidation does indeed fall above the ratio of 4:1, it is surprising that synergistic antioxidative effect is still achieved even at levels up to 50:1. Thus, while there is a lesser antioxidative effect at higher ratios than those ratios taught in U.S. Pat. No. 4,880,551, it is still quite acceptable and still represents a synergistic antioxidative effect when compared to the expected antioxidant effect.

Examples 1–3 (Comparative Examples)

Examples 1–3 were prepared by adding an appropriate amount of methylenebis(di-n-butyldithiocarbamate)—"Bis DTC" and 1-[di(4-octylphenyl) aminomethyl] tolutriazole—"Tolutriazole derivative" to a base oil (Exxon 150 manufactured by Exxon Corp.). The ratio of methylenebis(di-n-butyldithiocarbamate):1-[di(4-octylphenyl)aminomethyl] tolutriazole was intended to duplicate the lower (Example 1—1:4 ratio) and upper (Example 3—4:1 ratio) limits of the ratios defined in U.S. Pat. No. 4,880,551; Example 2 represents an intermediate ratio (1:1) between the lower and upper limits.

Examples 4–6

Examples 4–6 were prepared in a similar manner to that described above for Examples 1–3. The ratio of methylenebis(di-n-butyldithiocarbamate):1-[di(4-octylphenyl) aminomethyl] tolutriazole in the example lubricating compositions were intended to be representative of the applicants claimed range of ratios of above about 4:1 to about 50:1, i.e. Example 4—5:1 ratio and Example 6—38:1 ratio with Example 2 representing an intermediate ratio (11.3:1) between Examples 4 and 6.

Test Procedures

A Four-Ball Extreme Pressure Test was conducted according to the method described in ASTM D2783. Three highly polished steel balls 12.7 mm in diameter are placed in the tester. Test sample is placed in the ball pot to cover the three lower balls. The fourth ball is clamped in the chuck to keep the ball stationary. The rotation speed is 1760±40 rpm. The machine and test sample is then brought up to 65 to 95° F. and a series of 10 second runs are made at increasing loads until welding occurs. Two determinations are made from the data: (1) Load-Wear Index (LWI) and (2) Weld Point.

Another Four-Ball Wear Test was conducted according to the method described in ASTM D4172. Four highly polished steel balls 12.7 mm in diameter were placed in the tester and about 10 mL test sample was placed in the ball pot, sufficient to cover the balls. The test was conducted at a rotation speed of 1800 rpm under a load of 20 kg for 1 hour at 54.4° C. The scar diameter was measured to the nearest 0.01 mm.

TABLE 3

Wear and Extreme Pressure Data

| | Ex. 1–3 are comparative | | | | | |
|---|---|---|---|---|---|---|
| | 1 | 2 | 3 | 4 | 5 | 6 |
| (a) methylenebis(di-N-butyldithiocarbamate)-"Bis DTC" 100% active | 0.2 | 0.5 | 0.8 | 0.8337 | 0.9189 | 0.9743 |
| (b) 1-[di(4-octylphenyl)aminomethyl] tolutriazole-"Benzotriazole der." 50% active | 1.6 | 1.0 | 0.4 | 0.3323 | 0.1622 | 0.0513 |
| Exxon 150 SN 1005-83 | 98.2 | 98.5 | 98.8 | 98.834 | 98.919 | 98.9744 |
| Active Additive % | 1.0 | 1.0 | 1.0 | 1.0 | 1.0 | 1.0 |
| Active Ratio A:B (Bis DTC: Benzotriazole der). | 1:4 | 1:1 | 4:1 | 5:1 | 11.3:1 | 38:1 |
| ASTM D2783 4-Ball E.P. | | | | | | |
| Weld Load, kgf | 126 | 126 | 160 | 200 | 200 | 200 |
| Load Wear Index, kgf | 21.4 | 21.3 | 23.5 | 28.1 | 26.1 | 25.3 |
| ASTM D4172 4-Ball Wear | | | | | | |
| 1800 rpm, 54° C., 1 h @ 20 kgf, mm | 0.63 | 0.39 | 0.45 | 0.44 | 0.46 | 0.47 |
| 1200 rpm, 75° C., 1 h @ 40 kgf, mm | 0.63 | 0.63 | 0.66 | 0.63 | 0.61 | 0.61 |

As shown in Table 3, there is a surprising increase (ASTM D2783) in extreme pressure performance and maintainance (ASTM D4172) of antiwear activity with increased ratio of DTC (Examples 4–6), compared to the ratios taught in U.S. Pat. No. 4,880,551 (comparative Examples 1–3). Therefore, the inventors have found that improved extreme pressure properties can be achieved, while maintaining acceptable antioxidant and antiwear performance, even while increasing the Bis DTC:benzotriazole derivative ratio well beyond the range considered as the upper limit of performance as disclosed in the prior art.

The above embodiments have shown various aspects of the present invention. Other variations will be evident to those skilled in the art. Such modifications are intended to be within the scope of the invention as defined by the amended claims.

What is claimed is:

1. An antioxidant antiwear extreme pressure composition which comprises:
   (a) methylenebis(di-n-butyldithiocarbamate); and
   (b) a diphenylamine derivative of tolutriazole or benzotriazole,
   wherein the (a):(b) mass percent ratio ranges from above about 4:1 to about 50:1.

2. The antioxidant antiwear extreme pressure composition of claim 1, wherein the (a):(b) mass percent ratio ranges from above about 5:1 to about 40:1.

3. The antioxidant antiwear extreme pressure composition of claim 2, wherein the (a):(b) mass percent ratio ranges from above about 11.3:1 to about 38:1.

4. The antioxidant antiwear extreme pressure composition of claim 1, wherein the diphenylamine derivative of tolutriazole or benzotriazole is 1-[di-(4-octylphenyl)aminomethyl]tolutriazole.

5. The antioxidant antiwear extreme pressure composition of claim 2, wherein the diphenylamine derivative of tolutriazole or benzotriazole is 1-[di-(4-octylphenyl)aminomethyl]tolutriazole.

6. The antioxidant antiwear extreme pressure composition of claim 3, wherein the diphenylamine derivative of tolutriazole or benzotriazole is 1-[di-(4-octylphenyl)aminomethyl]tolutriazole.

7. The antioxidant antiwear extreme pressure composition of claim 1 which further comprises one or more ingredients selected from the group consisting of borated and/or non-borated dispersants, additional antioxidant compounds, seal swell compositions, friction modifiers, extreme pressure/antiwear agents, viscosity modifiers, pour point depressants, detergents, phosphates, antifoamants, rust inhibitors and copper corrosion inhibitors.

8. A lubricating composition comprising a major amount of a base oil and an antioxidative, antiwear/extreme pressure effective amount of an antioxidant antiwear extreme pressure composition which comprises:
   (a) methylenebis(di-n-butyldithiocarbamate); and
   (b) a diphenylamine derivative of tolutriazole or benzotriazole,
   wherein the (a):(b) mass percent ratio ranges from above about 4:1 to about 50:1.

9. The lubricating composition of claim 8 wherein the antioxidative, antiwear/extreme pressure effective amount is from about 0.01 to about 5.0% by weight, based on the total weight of the lubricating composition.

10. The lubricating composition of claim 9, wherein the (a):(b) mass percent ratio ranges from above about 5:1 to about 40:1.

11. The lubricating composition of claim 10, wherein the (a):(b) mass percent ratio ranges from above about 11.3:1 to about 38:1.

12. The lubricating composition of claim 9, wherein the diphenylamine derivative of tolutriazole or benzotriazole is 1-[di-(4-octylphenyl)aminomethyl]tolutriazole.

13. The lubricating composition of claim 10, wherein the diphenylamine derivative of tolutriazole or benzotriazole is 1-[di-(4-octylphenyl)aminomethyl]tolutriazole.

14. The lubricating composition of claim 11, wherein the diphenylamine derivative of tolutriazole or benzotriazole is 1-[di-(4-octylphenyl)aminomethyl]tolutriazole.

15. The lubrication composition of claim 8 which further comprises one or more ingredients selected from the group consisting of borated and/or non-borated dispersants, additional antioxidant compounds, seal swell compositions, friction modifiers, extreme pressure/antiwear agents, viscosity modifiers, pour point depressants, detergents, phosphates, antifoamants, rust inhibitors and copper corrosion inhibitors.

16. The lubricating composition of any one of claims 10–15 wherein the antioxidative antiwear/extreme pressure effective amount is from about 0.1 to about 3.0% by weight, based on the total weight of the lubricating composition.

* * * * *